US008929327B2

(12) United States Patent
Sayegh et al.

(10) Patent No.: US 8,929,327 B2
(45) Date of Patent: Jan. 6, 2015

(54) REDUCING HANDOFF LATENCY FOR A MOBILE STATION

(75) Inventors: Amir Antoun Renne Sayegh, Hamilton (CA); Terence Douglas Todd, Hamilton (CA); Dongmei Zhao, Hamilton (CA)

(73) Assignee: McMaster University, Hamilton, Ontario (CA)

( * ) Notice: Subject to any disclaimer, the term of this patent is extended or adjusted under 35 U.S.C. 154(b) by 1955 days.

(21) Appl. No.: 11/420,566

(22) Filed: May 26, 2006

(65) Prior Publication Data
US 2007/0274259 A1    Nov. 29, 2007

(51) Int. Cl.
H04W 4/00 (2009.01)
H04W 36/00 (2009.01)
H04L 29/06 (2006.01)
H04W 12/06 (2009.01)
H04W 36/08 (2009.01)
H04W 84/12 (2009.01)

(52) U.S. Cl.
CPC ....... H04W 36/0011 (2013.01); H04L 63/0869 (2013.01); H04W 12/06 (2013.01); H04W 36/08 (2013.01); H04W 84/12 (2013.01)
USPC ........... 370/331; 455/436; 455/437; 455/438; 455/439; 455/440; 455/441; 455/442

(58) Field of Classification Search
CPC ..... H04W 36/00; H04W 92/16; H04W 92/18; H04W 92/10
USPC .................................. 455/436–442
See application file for complete search history.

(56) References Cited

U.S. PATENT DOCUMENTS

| 6,473,413 | B1* | 10/2002 | Chiou et al. ............... 370/331 |
|---|---|---|---|
| 2002/0085511 | A1* | 7/2002 | Koponen et al. ........... 370/315 |
| 2004/0008645 | A1* | 1/2004 | Janevski et al. ........... 370/331 |
| 2005/0018637 | A1* | 1/2005 | Karoubalis et al. ....... 370/338 |
| 2005/0135624 | A1* | 6/2005 | Tsai et al. .................. 380/270 |
| 2005/0271021 | A1* | 12/2005 | Alemany et al. ........... 370/338 |
| 2006/0002355 | A1* | 1/2006 | Baek et al. ................. 370/338 |
| 2006/0046728 | A1* | 3/2006 | Jung et al. .................. 455/445 |
| 2006/0046754 | A1* | 3/2006 | Parikh et al. .............. 455/517 |
| 2006/0072507 | A1* | 4/2006 | Chandra et al. ............ 370/332 |
| 2006/0140150 | A1* | 6/2006 | Olvera-Hernandez et al. ........................ 370/331 |

OTHER PUBLICATIONS

Mishra, Arunesh et al., "Proactive Caching Strategies for IAPP Latency Improvement during 802.11 Handoff", Nov. 2002.
Moore, Tim et al., "Authenticated Fast Handoff", Nov. 2001.
Ji, Liang First Office Action for CA 2,583,182, Jan. 31, 2011.
Ji, Liang , Second Office Action for CA 2,583,182, Feb. 21, 2012.
Second Office Action for CA 2,583,182, Feb. 21, 2012.
Third Office Action for CA 2,583,182, Dec. 10, 2013.

\* cited by examiner

*Primary Examiner* — Vladimir Magloire
*Assistant Examiner* — Shantell L Heiber
(74) *Attorney, Agent, or Firm* — Integral Intellectual Property Inc.; Miriam Paton

(57) ABSTRACT

A mobile station is assisted to perform a handoff from a current access point in a current extended service set (ESS) to a new access point in a target ESS. A HandOver Mediator, possibly in conjunction with a handover server, performs an authentication process and an association process with an access point in the target ESS while masquerading as the mobile station. Parameters resulting from the authentication process and the association process are then passed to the mobile station and the mobile station can perform a handoff to the new access point.

10 Claims, 4 Drawing Sheets

REDUCING HANDOFF LATENCY FOR A MOBILE STATION

BACKGROUND

The invention generally relates to wireless local area networks (WLAN). In particular, embodiments of the invention relate to handoffs that occur as wireless mobile stations (MS) move in and out of the coverage areas of wireless access points (AP).

In IEEE 802.11 networks, basic service sets (BSS) are connected to one another via networks denoted distribution systems (DS). Multiple DSs may be interconnected by routing devices. A subnetwork is a portion of a network that shares a common address component and operates at Layers 1 and 2 (physical and data link) of the OSI (Open System Interconnection) reference model. On TCP/IP (Transmission Control Protocol/Internet Protocol) networks, subnetworks are all devices whose Internet Protocol (IP) addresses have the same prefix. Routers, and the process of routing, operate at Layer 3 (network) of the OSI reference model. In IEEE 802.11 an Extended Service Set (ESS) includes two or more BSSs that use the same service set identifier (SSID).

If the MS-AP link's quality drops below a predefined threshold, or for any other reason, a MS may decide to perform "handoff" and re-connect to the network through another AP. If the MS performs handoff between two APs that are connected to the same ESS, the handoff process is usually contained in Layer 1 (L1) and Layer 2 (L2) of the OSI reference model. If the MS performs handoff between two APs that belong to different ESSs, the handoff process may usually contain additional operations at L1 and L2 and additional operations in Layer 3 (L3).

For example, the MS may have to discard its association with its current AP and to perform an authentication and association process with the new AP. If the current AP and the new AP are coupled to different IP subnetworks, the authentication and association process may be followed by an acquisition of a new IP address. Additional delay may occur in L3 and higher layers, and may involve whatever native mobility management mechanism that is used in a particular DS, for example MIP (Mobile IP) or SIP (Session Initiation Protocol).

Due to the different processes involved and their accumulated delay, a handoff between different ESSs or a handoff between different ESSs and different IP subnetworks may result in a temporary disconnection of the MS from the network. For real-time applications, for example, voice over Internet Protocol (VoIP), it may be desirable to shorten this delay and therefore reduce the likelihood of this disconnection.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

In an IEEE 802.11 network, a MS may have to disconnect itself from an AP that is connected to one ESS and to reconnect with another AP that is connected to another ESS. The new AP and the current AP may be coupled to different IP subnetworks. The transition involves processes performed at OSI Layers 2 and 3 and the processes have associated delays. The handoff latency from the time the MS decides to connect to the other AP until the time this connection is achieved is affected by these delays. In addition, a temporary disconnection of the MS from the network may occur during the handoff.

According to embodiments of the invention, some or all of the L2 and L3 processes are pipelined in order to shorten the handoff latency and to reduce the probability of disconnection during the handoff. Pipelining some or all of the L2 and L3 processes is made possible by connecting a HandOver Mediator to the target ESS and having the HandOver Mediator masquerade as the MS.

Figure 1:
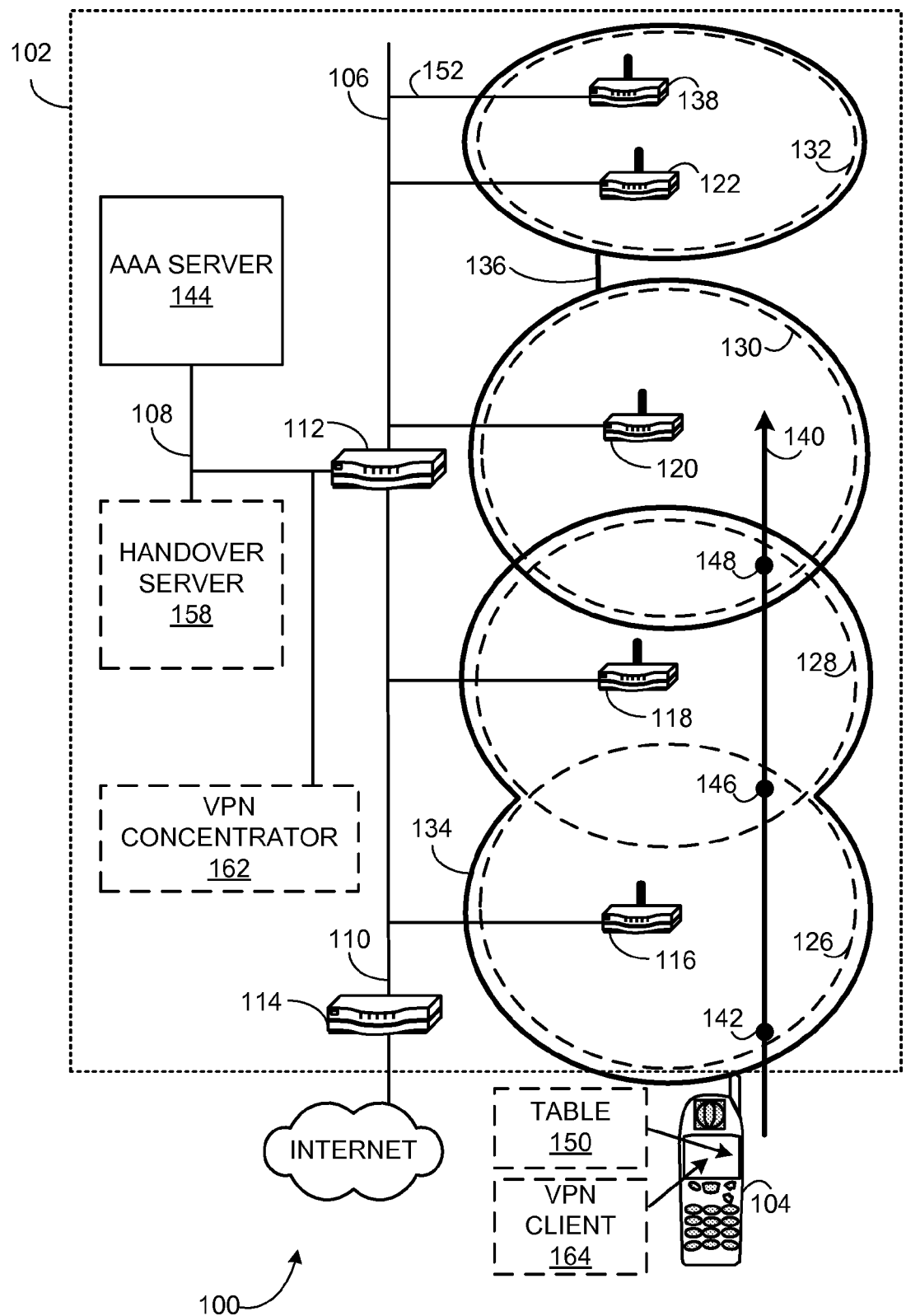
FIG. 1 is an illustration of an exemplary communication system, according to some embodiments of the invention.

Reference is made to FIG. 1, which is an illustration of an exemplary communication system 100, according to some embodiments of the invention. Communication system 100 includes a network 102, and a wireless mobile station (MS) 104.

A non-exhaustive list of examples for MS 104 includes a wireless-enabled laptop, a cellphone, a smartphone, a wireless-enabled personal digital assistant (PDA), a wireless-enabled video camera, a wireless-enabled gaming console, a wireless IP phone and any other suitable mobile station.

Network 102 includes subnetworks 106, 108 and 110, and a router 112 that provides Layer 3 connectivity between subnetworks 106, 108 and 110. Network 102 also includes a router 114 that provides Layer 3 connectivity between subnetwork 110 and the Internet. Network 102 includes APs 116, 118, 120 and 122 having coverage areas 126, 128, 130 and 132, respectively. In the example shown in FIG. 1, coverage areas 126 and 130 partly overlap with coverage area 128, and coverage area 132 does not overlap with any of coverage areas 126, 128 and 130.

APs 116 and 118 are connected to subnetwork 110 and form an ESS 134 with their combined coverage areas. APs 120 and 122 are connected to subnetwork 106 and form an ESS 136 with their combined coverage areas. MS 104 is able to execute processes to associate itself with any of APs 116, 118, 120 and 122.

In the example of FIG. 1, APs 116, 118, 120 and 122, and MS 104 are "802.11-enabled", which means that wireless communications therebetween are in accordance with one or more of the IEEE 802.11 standards defined by the Institute of Electrical and Electronic Engineers (IEEE) for Wireless Local Area Network (LAN) Medium Access Control (MAC) and Physical layer (PHY) specifications. However, it will be obvious to those of ordinary skill in the art how to modify the following for other existing WLAN standards or future related standards.

According to some embodiments, network 102 includes a HandOver Mediator (HOM) 138 that is an 802.11-enabled communication device. HOM 138 may be placed inside the coverage area of an AP that is part of ESS 136. In the example of FIG. 1, HOM 138 is placed within coverage area 132 of AP 122, however, in another example it may just as well be placed inside coverage area 130 of AP 120. HOM 138 is able to wirelessly connect as a client device AP 122, and is also able to connect to subnetwork 106 through a communication link 152. Communication link 152 may be a wireless link, a wired link, an optical link, or any combination thereof.

According to some embodiments of the invention, more than one HOM device may be connected to an ESS, for example, to accommodate an anticipated large number of concurrent handoff events involving several mobile stations.

According to some embodiments of the invention, HandOver Mediators may be connected to any number of ESSs in a communication system that include wireless access points in order to assist in handoff between the access points. For example, network 102 may include another HOM (not shown) in ESS 134 connected to subnetwork 110.

A user of MS 104 may move together with MS 104 along a trajectory 140 that crosses coverage areas 126, 128 and 130. The user of MS 104 may be participating in a voice communication session with a user of a correspondent communication node (CN) (not shown). The CN may be accessible via network 102 or via any network, for example, the Internet, that is coupled to network 102.

At a point 142 along trajectory 140, MS 104 may be associated with AP 116. At a point 146 along trajectory 140, the strength of signals from AP 116 received by MS 104 may fall below a predetermined threshold and consequently MS 104 may perform a handoff from AP 116 to AP 118. Since AP 116 and AP 118 belong to the same ESS, namely ESS 134, the handoff is governed by the IEEE 802.11 standards.

When the user and MS 104 reach a point 148 along trajectory 140, where the strength of signals from AP 118 received by MS 104 may fall below the predetermined threshold, MS 104 may be triggered to perform a handoff from AP 118 to AP 120. However, AP 118 and AP 120 do not belong to the same ESS, nor to the same IP subnetwork.

Figure 2:
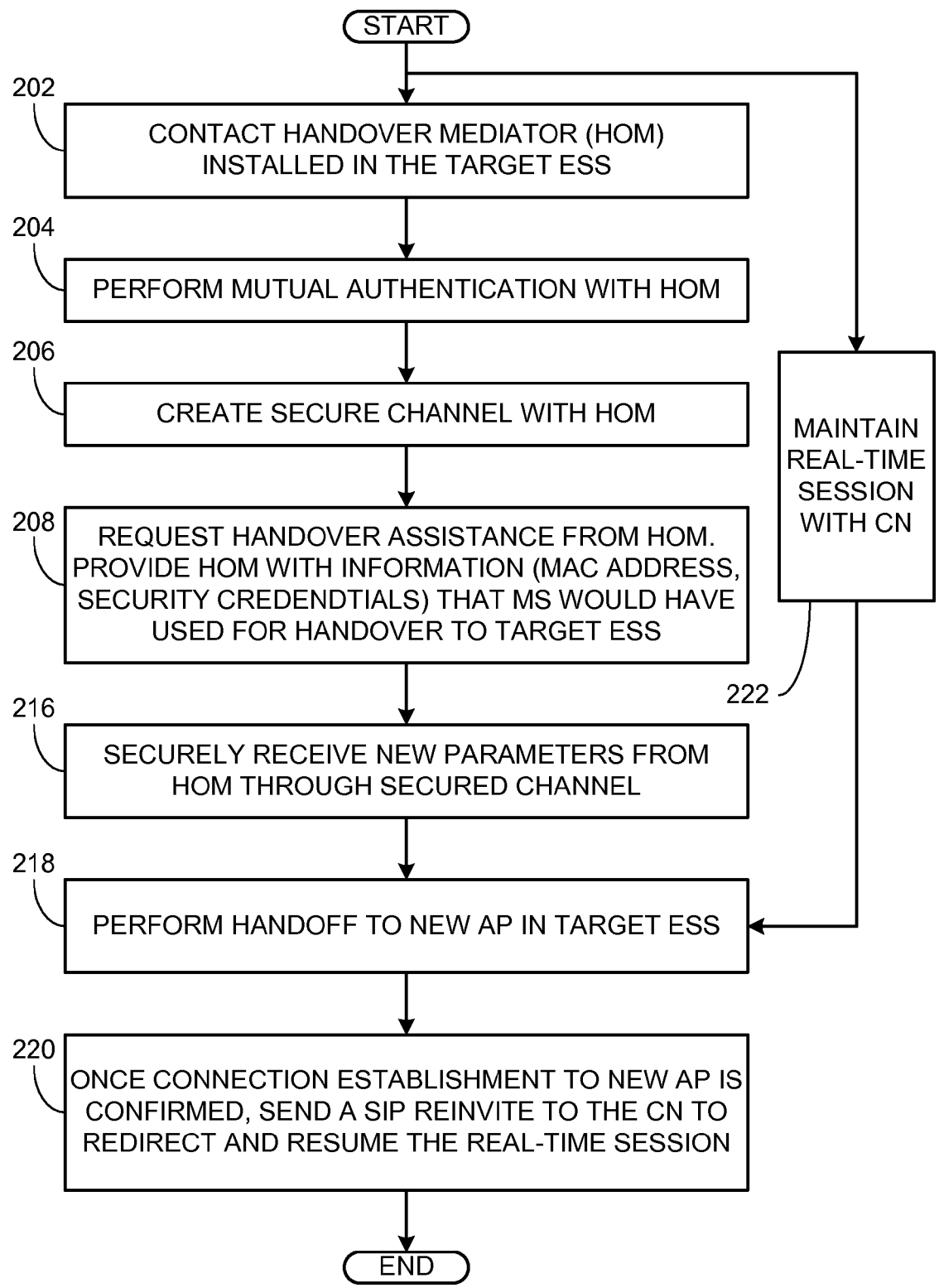
FIG. 2 is a flowchart of an exemplary method in a mobile station to perform a handoff, according to some embodiments of the invention.

Reference is made additionally to FIG. 2, which is a flowchart of an exemplary method in MS 104 to perform a handoff. This method assumes that MS 104, while associated with a current AP in a current ESS, has detected a new AP in a target ESS. MS 104 is able to identify the target ESS by its SSID. If the method of FIG. 2 is performed reactively, then it may be initiated once MS 104 has been triggered to perform a handoff from the current AP to the new AP. However, portions of the method of FIG. 2 may be performed proactively before the handoff is imminent.

At 202, MS 104 contacts a HOM installed in the target ESS. For example, MS 104 contacts HOM 138 in ESS 136. This can be accomplished in many different ways.

For example, a server (not shown) in network 102 may provide this service. The server may maintain information about the various HOMs in network 102, their IP addresses and which ESSs they belong to. MS 104 may contact the server in order to obtain data used for contacting HOM 138.

In another example, MS 104 may store in its memory a table 150 containing mappings of ESSs to HOM IP addresses. The information in this table may be pushed to MS 104 from a server or pulled by MS 104 from the server or preloaded in any other manner, for example, as part of a software update. In this case, MS 104 may retrieve the IP address of HOM 138 from table 150.

Figure 3:
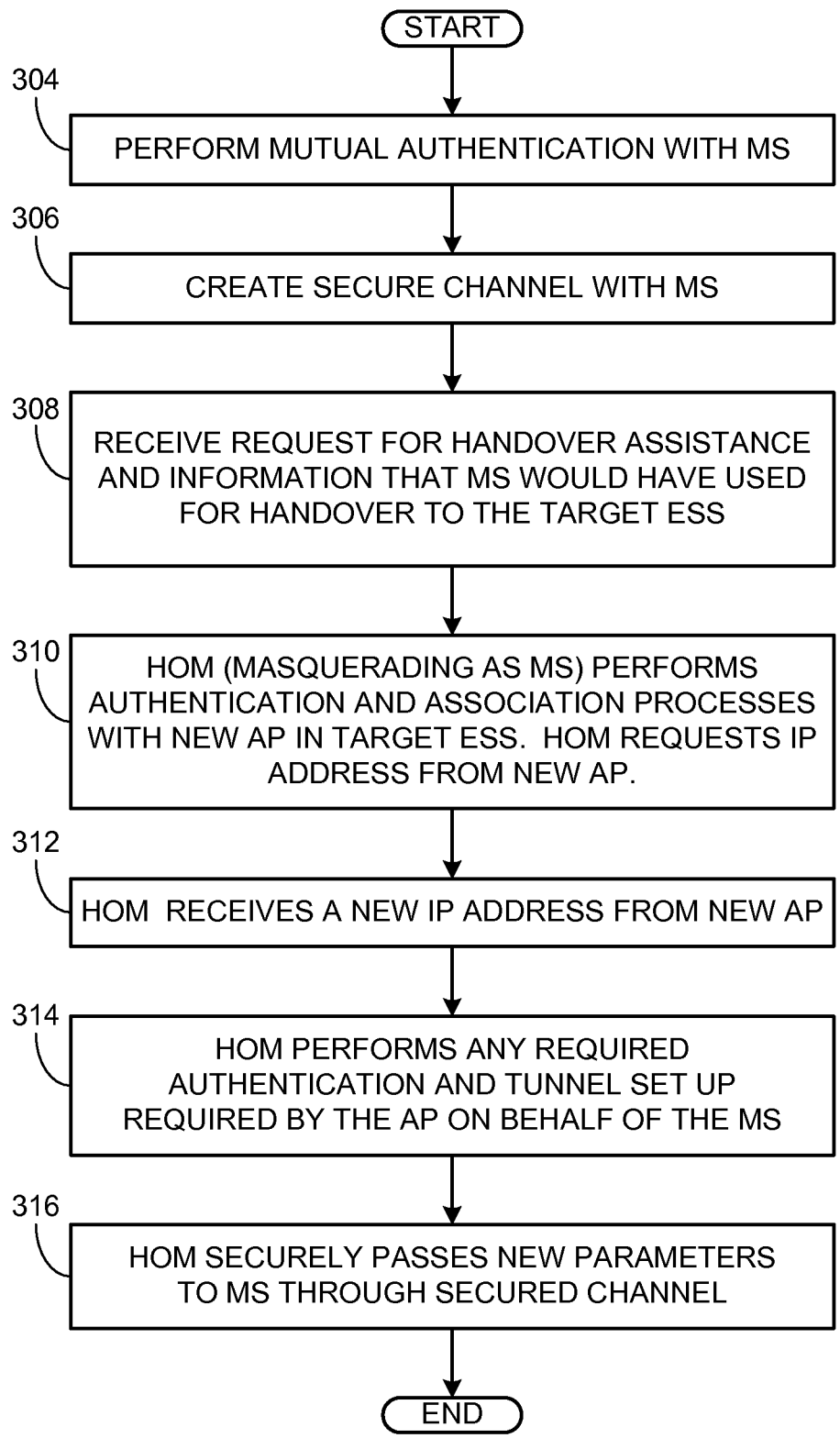
FIG. 3 is a flowchart of an exemplary method to assist a mobile station in performing a handoff, according to some embodiments of the invention.

Reference is made additionally to FIG. 3, which is a flowchart of an exemplary method in HOM 138 to assist MS 104 in performing the handoff.

At 204 and 304, HOM 138 and MS 104 perform mutual authentication.

At 206 and 306, HOM 138 and MS 104 create a secure communication channel therebetween so that traffic between HOM 138 and MS 104 is encrypted.

At 208, via the secure communication channel, MS 104 requests handoff assistance from HOM 138. MS 104 provides HOM 138 with information that MS 104 would have used for handoff from ESS 134 to ESS 136. The information may include, for example, the MAC address of MS 104 and security credentials. HOM 138 receives this request and this information at 308.

At 310, HOM 138 performs a connectivity sequence with AP 122, which is the AP in ESS 136 which is detectable by HOM 138. The connectivity sequence may include three consecutive processes—a "probing" process, an "authentication" process and an "association" process. During the authentication and association processeses, HOM 138 masquerades as MS 104, for example, using the MAC address of MS 104, and any other relevant information.

The authentication process can have many different forms, depending on the security mechanism deployed in the particular network. For example, network 102 may include an "AAA" (Authentication, Authorization and Accounting) server 144 that is configured to inspect authentication requests and to decide whether to grant permission to connect with any of APs 116, 118, 120 and 122. AAA server 144 may provide authentication and authorization services in compliance with, for example, the IEEE 802.1X standard or with the Extensible Authentication Protocol (EAP). In that case, the authentication process and the association process may involve communications between MS 104/HOM 138 and an AP, and communications between the AP and AAA server 144.

The total time for HOM 138 to complete a full connectivity sequence may vary and may be as long as several seconds, for example, 3 seconds. The probing process itself may take, for example, 20 milliseconds to 1 second.

If DHCP (Dynamic Host Configuration Protocol) is used in network 102, HOM 138 also requests an IP address (on behalf of MS 104) from AP 122 at 310, and receives a new IP address from AP 122 at 312.

At 314, HOM 138 performs any procedure required by network 102, for example authentication and/or tunnel setup, on behalf of MS 104. For example, if network 102 does call-admission control, AP 122 will perform its normal call-admission control with HOM 138 to see whether AP 122 can support the new call.

At 316, HOM 138 sends to MS 104 through the secure channel the parameters received from AP 122 in connection with the communication channel created between AP 122 and HOM 138. The parameters may include the IP address received from AP 122, and any byproducts of authentication (e.g. security credentials) that would be necessary if AP 122 would later spontaneously request re-authentication of MS 104. At 216, MS 104 receives these parameters from HOM 138.

Using the parameters received from HOM 138, MS 104 initiates a handoff process at 218 by breaking its connection with AP 118 and sending an authentication request to AP 120. AP 120 interprets the authentication request as coming from a MS that was previously associated with AP 122, which belongs to the same ESS as AP 120. Instead of forwarding the authentication request to AAA server 144, AP 120 may use L2 and L1 protocols, for example IAPP (Inter Access Point Protocol), to query AP 122 about MS 104 and to receive security information related to MS 104 from AP 122. Since AP 122 is associated to HOM 138 masquerading as MS 104, AP 122 sends the requested information to AP 120. This process may be significantly shorter than an authentication process that involves interaction with AAA server 144. If the authentication process is successfully completed, MS 104 may proceed to the association process. However, since HOM 138 masquerading as MS 104 is already associated with AP 122 of ESS 136, MS 104 may perform a "re-association" process instead of an association process. The re-association process may also be completed using interactions between AP 122 and AP 120 and may be shorter than one involving AAA server 144.

The handoff process at 218 may take roughly tens or hundreds of milliseconds, which is far shorter in duration than multi-second handoffs.

At 222, MS 104 maintains the real-time session with the CN via AP 118 until MS 104 disassociates from AP 118 while performing the handoff to AP 120 at 218.

Once the handoff is complete and a connection between MS 104 and AP 120 is established and confirmed, MS 104 may at 220 send a SIP re-invite message, or an equivalent message in another protocol, to the CN to redirect and resume the real time session.

Figure 4:
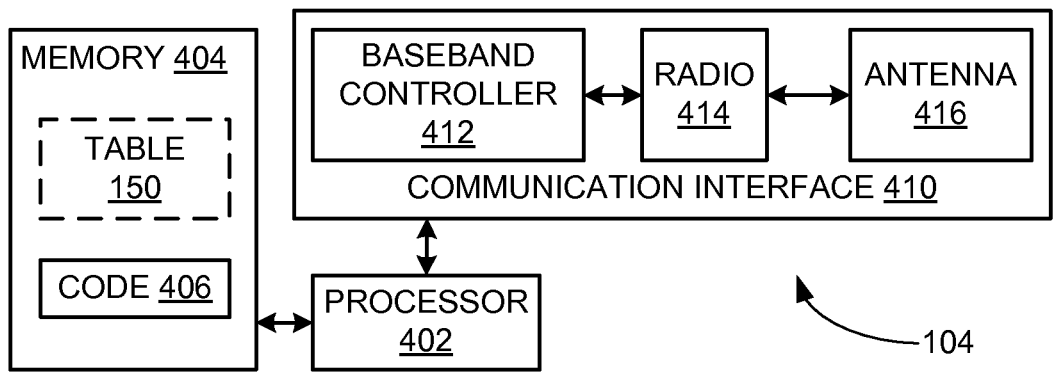
FIG. 4 is a block diagram of a mobile station, according to some embodiments of the invention.

FIG. 4 is a block diagram of mobile station 104, according to some embodiments of the invention. Mobile station 104 includes a processor 402, and a memory 404 coupled to processor 402. Memory 404 stores code 406 that, when executed by processor 402, may implement the method of FIG. 2. Memory 404 may also store table 150 as described above. Mobile station 104 includes a wireless communication interface 410, compatible with one or more standards of the family of IEEE 802.11 wireless communication standards. Wireless communication interface 410 is coupled to processor 402 and includes at least a baseband controller 412, a radio 414, and an antenna 416. Mobile station 104 includes other components that are not shown in FIG. 4 for clarity.

Figure 5:
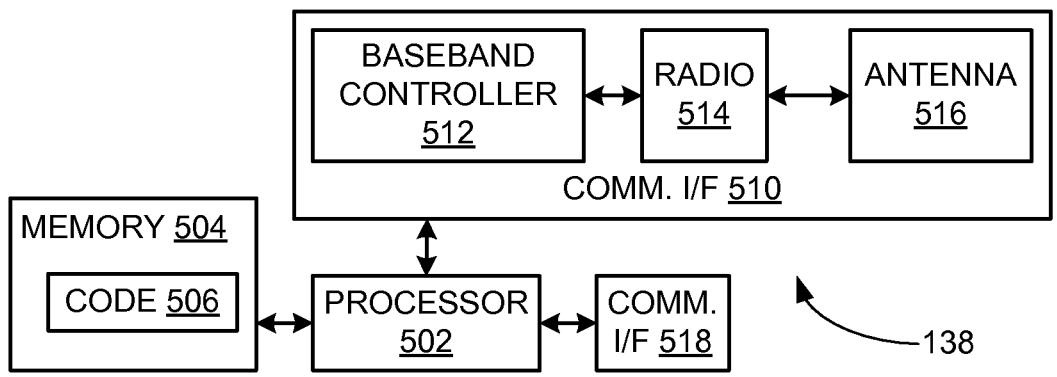
FIG. 5 is a block diagram of a HandOver Mediator, according to some embodiments of the invention.

FIG. 5 is a block diagram of HOM 138, according to some embodiments of the invention. HOM 138 includes a processor 502, and a memory 504 coupled to processor 502. Memory 504 stores code 506 that, when executed by processor 502, may implement all or part of the method of FIG. 3.

HOM 138 includes a wireless communication interface 510, compatible with one or more standards of the family of IEEE 802.11 wireless communication standards. Wireless communication interface 510 is coupled to processor 502 and includes at least a baseband controller 512, a radio 514, and an antenna 516.

HOM 138 includes a communication interface 518 through which HOM 138 can communicate with subnetwork 108. Communication interface 518 may be a wireless communication interface, a wired communication interface or an optical communication interface or a combination thereof. HOM 138 includes other components that are not shown in FIG. 5 for clarity.

According to some embodiments of the invention, communication systems may optionally include a handover server such as optional handover server 158 in FIG. 1. Access points in a network may be able to reach the corresponding handover server. Packets to and from mobile stations in a network may be routed through the handover server. The handover server may inspect the packets and will be aware of IP addresses that are assigned to mobile stations in the network. For example, handover server 158 may be aware of an IP address assigned to MS 104 when MS 104 is associated with AP 118. Alternatively, handover server 158 may be responsible for the distribution of IP addresses that it may have to lease from a DHCP server (not shown).

A handover server may communicate with HOM devices in a network by way of secured tunnels. The functionality of the method of FIG. 3 may be performed partly by HOM 138 and partly by handover server 158. Splitting this functionality may help reduce cost in a network by optimizing the required performance levels of the different devices. Concentrating all or part of the functionality at handover server 158 may allow for more involved handoff optimization techniques.

For example, HOM 138 may be a simple L1 radio interface and all the intelligence may reside on handover server 158.

In another example, once MS 104 contacts HOM 138 to initiate a handoff process, HOM 138 may inform handover server 158 that MS 104 requested a handoff. Once HOM 138 has acquired an IP address for MS 104, it will signal that IP address to handover server 158. HOM 138 may not be able to inform handover server 158 whether MS 104 actually finalized a handoff. To verify whether the handoff process has been completed, handover server 158 may have to inspect packets to identify whether they are addresses to or from that IP address, or to query AP 120 using, for example, IAPP or IEEE 802.11f for access point interoperability via an access point protocol across distribution systems supporting IEEE 802.11 operations.

In some other embodiments of the invention, handover server 158, upon recognizing that MS 104 entered network 102, may reserve for MS 104 in advance IP addresses for some or all the relevant subnetworks of network 102. For example, techniques such as neighbor graphs may be used by handover server 158 to identify to which subnetworks MS 104 can be expected to move, and reserve IP addresses only for these subnetworks.

Figure 6:
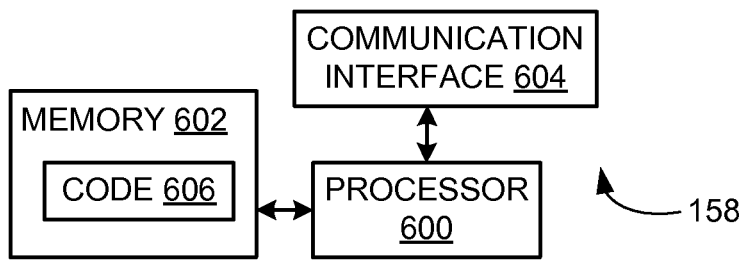
FIG. 6 is a block diagram of handover server, according to some embodiments of the invention.

FIG. 6 is a block diagram of handover server 158, according to some embodiments of the invention. Handover server 158 includes a processor 600, and a memory 602 coupled to processor 600. Memory 602 stores code 606 that, when executed by processor 600, may implement portions of the methods described herein. Handover server 158 includes a communication interface 604 through which it can communicate with subnetwork 110. Communication interface 604 may be a wireless communication interface, a wired communication interface or an optical communication interface or any combination thereof. Handover server 158 includes other components that are not shown in FIG. 6 for clarity.

Network 102 may optionally include a VPN (Virtual Private Network) concentrator 162. Users, such as the user of MS 104, may be given security credentials, such as a user-id and a password, to be used for accessing resources of network 102. Any of APs 116, 118, 120 and 122 may permit MS 104 to complete an association process and to receive an IP address, however, MS 104 would not be able to access resources of network 102 unless authentication has been made and/or encryption has been activated.

For authentication purposes, MS 104 may include a VPN client 164, usually software or a combination of software and hardware. VPN client 164 is able to establish a secure communication tunnel between MS 104 and VPN concentrator 162 using security credentials of the user of MS 104. Once authentication has been accomplished, VPN concentrator 162 may be able to enforce security policies on MS 104 and its user. MS 104 may have to re-negotiate and re-establish a secured tunnel with VPN concentrator 162 if the IP address assigned to MS 104 is changed.

For that reason, or for any other reason, at 314 of FIG. 3, HOM 138 (or handover server 158) may, in addition to operations previously described, re-negotiate a new secured tunnel with VPN concentrator 162 on behalf of MS 104. At 316, HOM 138 (or handover server 158) may, in addition to operations previously described, provide MS 104 with the parameters of the secured channel negotiated with VPN concentrator 162.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a mobile station, the method comprising:
   connecting to a network via a first wireless access point that belongs to a first extended service set (ESS);
   responsive to detecting a second wireless access point that belongs to a second ESS that differs from the first ESS:
      connecting to a wireless device via the first wireless access point and the network, the wireless device configured to assist the mobile station to perform handoffs to any wireless access points that belong to the second ESS by masquerading as the mobile station in the second ESS;
      providing the wireless device, via the first wireless access point and the network, with information about the mobile station and requesting handoff assistance from the wireless device;
      receiving parameters from the wireless device, via the first wireless access point and the network, the parameters resulting from the wireless device having performed, while masquerading as the mobile station using the information, an authentication process and an association process via direct wireless communication with a wireless access point that belongs to the second ESS and in which coverage area the wireless device is located; and
   performing a handoff to the second wireless access point.

2. The method of claim 1, wherein the information includes a media access control (MAC) address of the mobile station.

3. The method of claim 1, wherein the information includes security credentials of the mobile station.

4. The method of claim 1, further comprising:
   establishing a secure communication channel with the wireless device via the first wireless access point and the network,
   wherein the information is sent to the wireless device in an encrypted manner over the secure channel.

5. The method of claim 1, wherein connecting to the wireless device comprises:
   connecting to the wireless device using data about the wireless device that is stored in the mobile station.

6. The method of claim 1, wherein connecting to the wireless device comprises:
   connecting to the wireless device using data about the wireless device that is obtained by the mobile station via the first wireless access point.

7. The method of claim 1, wherein performing the handoff to the second wireless access point includes sending a reassociation request to the second wireless access point.

8. The method of claim 1, wherein the first wireless access point is coupled to a first Internet Protocol subnetwork and the second wireless access point is coupled to a second, different Internet Protocol subnetwork and wherein the parameters include an Internet Protocol address to be used by the mobile station while associated with the second wireless access point.

9. The method of claim 1, wherein the parameters include security credentials to be used by the mobile station while associated with the second wireless access point.

10. The method of claim 1, wherein the second wireless access point is the wireless access point with which the wireless device performed the authentication process and the association process while masquerading as the mobile station.

* * * * *